United States Patent Office 3,194,089
Patented July 13, 1965

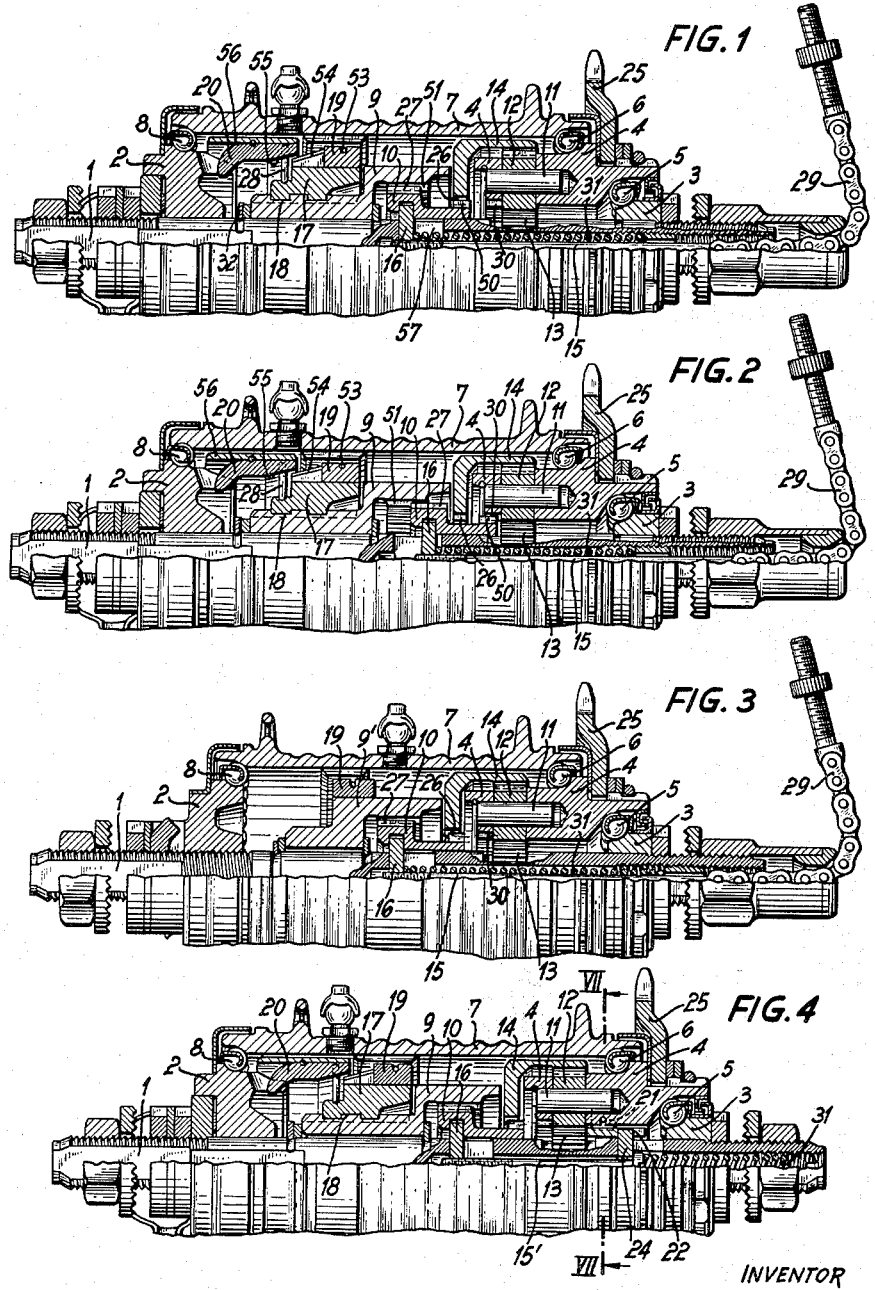

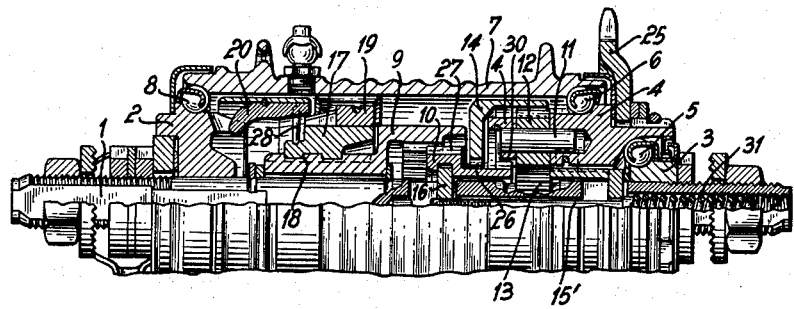
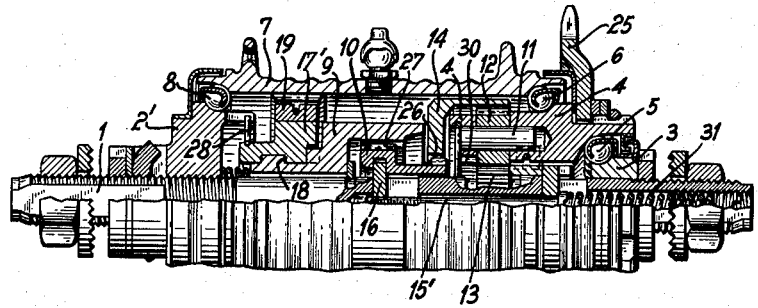
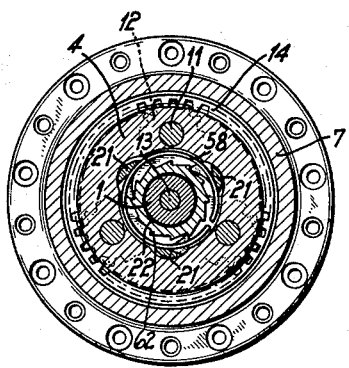
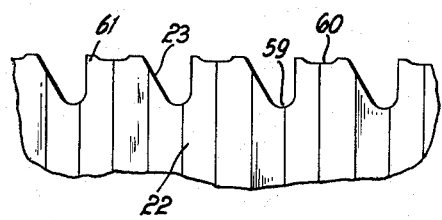

3,194,089
DUAL-SPEED WHEEL HUB
Hans Joachim Schwerdhöfer, Schweinfurt (Main), Germany, assignor to Fichtel & Sachs A.G., Schweinfurt (Main), Germany, a corporation of Germany
Filed May 24, 1962, Ser. No. 197,381
Claims priority, application Germany, May 27, 1961, F 34,039
12 Claims. (Cl. 74—750)

This invention relates to multiple speed hubs for the driven wheels of bicycles and similar vehicles, and is more particularly concerned with a hub which permits the associated wheel to be driven either at a speed equal to the hub input speed or at a higher speed.

It is common practice to achieve dual transmission ratios in a bicycle hub and the like by means of planetary gearing cooperating with freewheeling or one-way clutches. In one known hub of this type, speed change is accomplished by axially shifting one of the elements of the planetary gearing, either the planet wheel carrier or the ring gear. While such an arrangement has the advantage of requiring only a single free-wheeling clutch in the power transmission train, the need for axially shifting the position of one of the planetary gear wheels makes the hub relatively complex.

In another known dual-speed hub, the planetary gearing is held in a fixed radial plane. If only a single freewheeling clutch is provided in such a hub, the two wheel speeds are limited to a speed equal to the input speed of the hub, and to a lower speed. A higher speed than the input speed cannot be obtained unless two freewheeling clutches are employed. If the hub is also equipped with a coaster brake, an additional claw coupling with circumferential lost motion must be interposed between one of the freewheeling clutches and the hub shell to prevent blocking of the brake when a bicycle equipped with the hub rolls backward.

The object of the invention is the provision of a dual speed hub providing a wheel speed equal to the input speed of the hub, and another speed higher than the input speed, the hub to be free of the shortcomings of the known devices.

For simplicity of structure, light weight and low bulk, the invention is aimed at a duel speed hub in which the elements of the planetary gearing are in a fixed axial position, yet only one freewheeling clutch is needed to transmit power from the gearing to the hub shell.

Another object is the provision of a dual speed hub in which backward rolling of a bicycle equipped with the hub and a built-in coaster brake cannot block the brake even without the provision of special lost motion devices.

With these and other objects in view, the invention in one of its aspects provides a bicycle hub in which the drive sprocket is secured to the planet carrier of the usual planetary gearing for joint movement. A coupling member is alternatively engageable with the planet wheel carrier and the ring gear of the planetary gearing for rotation about the hub axis at the speed of the sprocket, and at a higher speed respectively. The coupling member drives the input member of a freewheeling clutch the output member of which is fastened to the hub shell.

Other features and many of the attendant advantages of this invention will be readily appreciated as the same becomes better understood by reference to the following detailed description when considered in connection with the accompanying drawings in which like reference numerals designate like parts throughout the figures thereof, and wherein:

FIG. 1 is a fragmentary side elevational view of a dual speed hub of the invention set for high-speed operation, one half of the hub being shown in section on an axial plane;

FIG. 2 shows the hub of FIG. 1 set for low-speed operation;

FIG. 3 shows a second embodiment of the invention in a view corresponding to that of FIG. 1;

FIG. 4 shows a third embodiment in a view corresponding to FIG. 1;

FIG. 5 illustrates the device of FIG. 4 in position for low-speed operation;

FIG. 6 shows a fourth embodiment of the invention set for high-speed operation;

FIG. 7 is a radially sectional view of the hub of FIG. 4 taken on the line VII—VII; and FIG. 8 is a developed view of an annular cam of the hub of FIG. 4 on a greatly enlarged scale.

Referring now to FIG. 1, there is seen a bicycle hub of conventional external appearance. All other elements of the hub assembly are mounted on a stationary shaft 1 equipped to be fastened to the rear fork of a bicycle or other vehicle. For convenience of description, the two axial ends of the shaft will be referred to hereinafter as the drive end and the brake end, and other axially extending elements of the mechanism will be referred to in an analogous manner.

An annular bearing member 2 is fixedly fastened to the brake end of the shaft 1, and another bearing member 3 to the drive end. A ball bearing 5 on the bearing member 3 rotatably supports the drive end of a planet wheel carrier 4. Ball bearings 6, 8 mounted on the planet wheel carrier 4 and the bearing member 2 rotatably support a hub shell 7 which encloses the operating elements of the hub with the exception of a drive sprocket 25 fixedly fastened to the planet wheel carrier 4.

The respective axial positions of the working elements of the hub, with specifically described exceptions, are determined by their abutment against each other and against the bearing members 2, 3. With few exceptions which will be apparent from the following description, the working elements of the hub are of tubular shape and coaxial with the stationary shaft 1 on which they are rotatably mounted.

A sunwheel 13 fixed on the shaft 1 meshes with three planet wheels 12 of which only one is seen in the several axially sectional views of the drawing. Each planet wheel 12 is rotatably mounted on the planet wheel carrier 4 by means of an eccentric shaft 11. The planet wheels 12 also mesh wtih an external ring gear 14.

Identical internal gear rims 30, 26 on the planet wheel carrier 4 and the ring gear 14 are axially spaced from each other and are alternatively engageable by a mating first external gear rim 50 on the drive end of an axially movable and rotatable coupling sleeve 10. A second external gear rim 27 on the brake end of the coupling sleeve 10 has axially elongated teeth and meshes with the similarly elongated teeth of an internal gear rim 51 on the drive end of a driver member 9. The axial position of the member 9 is fixed by ring washers 32 engaging annular grooves in the shaft 1.

An outer cylindrical face of the driver member 9 is formed with integral coarse flat threads 18 which engage mating threads on a pawl carrier 17. The pawl carrier is the input member of a freewheeling or one-way clutch, the output member of which is a ratchet 53 fixed on the inner wall of the hub shell 7. Spring loaded pawls 19 pivotable on the carrier 17 drivingly engage the ratchet 53 when the sprocket 25 rotates in the normal driving direction, and permit freewheeling when the hub shell 7 overtravels the pawl carrier 17.

The pawl carrier 17 has a conical face 54 axially engageable with an internal conical face 55 of an axially slotted brake sleeve 56. When the pawl carrier moves threadedly on the driver member 9 toward the brake end of the hub, engagement of the faces 54, 55 causes the sleeve 56 to spread into frictional engagement with the internal wall of the hub shell 7. The sleeve 56 is secured against rotation relative to the shaft 1 by radially projecting lugs which engage corresponding recesses in the stationary bearing member 2. A wire spring 28 is bent into an open circular loop which frictionally engages a corresponding groove in the pawl carrier 17, and has an end portion radially projecting from the groove into engagement with an axially elongated slot in the sleeve 56.

Axial movement of the coupling sleeve 10 is actuated by a block 16 which is axially slidable and secured against rotation in a guide slot 57 of the hub shaft 1. The block 16 engages a conforming annular groove in the coupling sleeve 10. It is fastened to the brake end of a push rod 15 which is slidable in an axial bore of the shaft 1. The drive end of the rod 15 is attached to a link chain 29 connected to a speed control mechanism elsewhere on the bicycle. The chain is a tension member which can move the actuator block 16 toward the drive end of the hub only. Movement in the opposite direction is energized by a helical compression spring 31 which abuts against the block 16 and a fixed abutment in the axial cavity of the shaft 1.

In the position of the apparatus illustrated in FIG. 1, the coupling sleeve 10 engages the ring gear 14 for high speed rotation of the hub shell 7. Motive power is transmitted to the hub shell from the drive sprocket 25 through the planet carrier 4, the planet wheels 12, the ring gear 14, the coupling sleeve 10, the driver member 9, the pawl carrier 17, the pawls 19, and the ratchet 53. The teeth of the latter are of sufficient length to ensure engagement with the pawls 19 in all operative positions of the pawl carrier.

In the position illustrated in FIG. 2, the block 16 is held in a position nearer the drive end of the hub by tension in the chain 29, and the coupling sleeve 10 engages the gear rim 30 of the planet wheel carrier 4 by means of its external gear rim 50. The axial spacing of the gear rims 26, 30 is sufficient to make simultaneous meshing engagement with the gear rim 50 impossible.

Motive power is transmitted from the sprocket 25 by way of the planet carrier 4, the coupling sleeve 10, the driver member 9, the pawl carrier 17, the pawls 19, and the ratchet 53 to the hub shell 7 which rotates at the same speed as the drive sprocket 25.

When the sprocket is rotated in a direction opposite to the normal driving direction, by back pedaling or otherwise, the backward rotation of the planetary gearing causes threaded movement of the pawl carrier 17 on the driver member 9 toward the brake end of the hub because of the frictional resistance of the spring 28 to any rotation of the pawl carrier. The spring resistance is no longer overcome by abutment of the pawl carrier against another hub element as is the case during forward rotation. The conical faces 54, 55 are engaged, and the resulting spreading of the sleeve 56 causes the shell 7 to be frictionally engaged with the shaft 1 after a certain angular movement of the sprocket 25.

The embodiment of the invention illustrated in FIG. 3 is identical in many respects with that shown in FIGS. 1 and 2. It lacks a coaster brake, and the corresponding elements of the apparatus of FIGS. 1 and 2 are therefore not found in FIG. 3. The driver member 9' is not equipped with external threads. The pawl carrier may be fixedly fastened to the driver member when no braking action is needed. In the embodiment illustrated, the pawl carrier is an integral part of the driver member 9' to which the pawls 19 are pivoted.

All other elements of the hub of FIG. 3 are identical with those of the hub of FIG. 1, and the hub operates in the same manner, but back pedaling merely causes freewheeling of the pawl clutch 17, 19, 53.

The dual-speed hub shown in FIGS. 4 and 5 differs from that illustrated in FIGS. 1 and 2 by the speed changing mechanism only. The sliding block 16 which actuates axial movement of the coupling sleeve 10 is attached to the brake end of a rod 15' the drive end of which carries another similar block which is quite narrow in a circumferential direction. The block 24 is axially movable in a slot of the shaft 1 and secured therein against rotation. It is urged toward the brake end of the hub and into engagement with the annular cam face 23 of a speed changing sleeve 22 by the helical return spring 31.

FIG. 8 shows the cam face 23 in a developed enlarged view. The cam face has alternating deep notches 59 and shallow notches 58 which extend axially inward from intervening portions 61 of a flat terminal radial surface of the coupling sleeve 22. The deep notches 59 each have one axial side wall and one side wall which is more gradually inclined.

As best seen in FIG. 7, the speed changing sleeve 22 has external ratchet teeth 62 which cooperate with pawls 21 pivotable on an internal face of the planet wheel carrier 4 and are urged into engagement by an annular pawl spring 58. The one-way clutch formed by the pawls 21 and the ratchet teeth 62 is arranged in such a manner that the sleeve 22 is rotated by the planet wheel carrier 4 during backward rotation of the sprocket 25. This results in movement of the block 24 along the cam face 23 from the right toward the left as viewed in FIG. 8. The pressure of the spring 31 tends to arrest this movement when the block 24 engages either a deep notch 59 or a shallow notch 60. When the block 24 is at the bottom of a deep notch 59, the rod 15' is in the terminal position of its stroke near the brake end of the hub, and the latter is set for high-speed wheel movement as illustrated in FIG. 4. Engagement of the block 24 with a shallow notch 60 corresponds to the low-speed position of the hub seen in FIG. 5.

The dual speed hub illustrated in FIGS. 4 and 5 is equipped with a coaster brake identical with that described above with reference to FIGS. 1 and 2. Back pedaling thus causes alternating engagement of the block 24 with shallow and deep notches in the cam face 23 until the brake frictionally locks the hub shell 7 to the shaft 1, and makes further back-pedaling impossible. The pitch of the coarse threads 18 and the angular spacing of the notches 59, 60 is preferably correlated in one of two ways.

In a first preferred arrangement, the brake is made to engage the hub shell to the shaft after back pedaling through an angle corresponding to slightly more than the angular center to center spacing between a deep notch 59 and the adjacent shallow notch 60, but smaller than the angular spacing between two successive shallow notches 60 or deep notches 59. In this arrangement back pedaling causes a single speed shift. Further back pedaling actuates the brake without causing a second speed shift. When driving is resumed after braking, a quick backward move of the pedals restores the original speed if so desired.

In the second preferred arrangement, the brake is made to engage after back pedaling through an angle corresponding to the angular center to center spacing of two successive deep or shallow notches. Backpedaling in this arrangement first causes a speed change, and then a change back to the original speed with simultaneous application of the brake. A speed change upon resumption of driving is not necessary, but it is left to the operator's skill to stop backpedaling at the proper angle when wishing merely to change speed without braking.

A modification of the embodiment of the invention shown in FIGS. 4 and 5 is illustrated in FIG. 6. The dual speed hub of FIG. 6 differs from that of FIGS. 4 and 5 by the omission of a coaster brake. To prevent unlimited alternating speed changes during backpedaling, the pawl carrier 17' is arranged to abut against a radial face of the bearing member 2' after backpedaling through an angle which may be correlated with the pitch of the threads 18 as described in the preceding paragraphs. The spring 28 which frictionally engages the pawl carrier 17' is secured against rotation relative to the shaft 1 by engagement of an end portion radially projecting from the pawl carrier 17' with an axially elongated slot in the bearing member 2'. The spring 28 thus frictionally interferes with rotation of the pawl carrier 17' relative to the shaft 1, and thus causes threaded movement of the carrier 17' on the driver member 9 unless the carrier 17' abuts in the direction of movement either against a radial face of the driver member 9, as is normal during driving rotation of the sprocket 25, or against the bearing member 2', as after completion of a speed change.

As is evident from the several examples of preferred embodiments selected for the purpose of the disclosure, this invention is capable of many modifications, and such modifications will readily suggest themselves to those skilled in the art. While a coaster brake of the expanding sleeve type has been specifically described, any other brake that is operated by backward rotation of the drive sprocket is capable of being combined with this invention in an analogous manner. Whether the brake is actuated by threads, by cams or in any other known manner is not necessarily of influence on the basic features of the dual speed hub of the invention.

Numerous types of freewheeling one-way clutches may be substituted for the pawl clutches illustrated. A coupling sleeve having external gear rims on its axial end portions is preferred for selective engagement with several elements of the planetary gearing since a coupling sleeve of this type may readily be manufactured on an automatic hobbing machine, but other coupling arrangements may be equally operative.

The planet wheel carrier of the invention which is fixedly attached to the drive sprocket has been illustrated and described as an integral unitary machine element. If so desired, the planet wheel carrier may be rigidly assembled from several individual parts where its shape or specific requirements of manufacture or use make a divided planet wheel carrier preferable.

It should be understood, therefore, that the foregoing disclosure relates to only preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. In a dual-speed hub for a bicycle and the like, in combination:
    (a) a shaft having an axis;
    (b) drive sprocket means rotatable about said axis;
    (c) planetary gearing including
        (1) sun wheel means fixed on said shaft;
        (2) ring gear means coaxial with said sun wheel means; and
        (3) planet wheel means in simultaneous engagement with said sun wheel means and said ring gear means;
    (d) a planet wheel carrier secured to said sprocket means for joint rotation and rotatably carrying said planet wheel means;
    (e) coupling means axially movable on said shaft for alternative driving engagement with said planet wheel carrier and with said ring gear means;
    (f) freewheeling clutch means operatively connected to said coupling means for selective joint rotation with said planet wheel carrier and said ring gear means respectively; and
    (g) hub shell means rotatable about said axis and in one-way driving engagement with said clutch means.

2. In a hub as set forth in claim 1, a driver member rotatable on said shaft and engaging said coupling means, said clutch means being mounted on said driver member.

3. In a hub as set forth in claim 2, said clutch means being fixedly secured to said driver member.

4. In a hub as set forth in claim 2, said clutch means including an input member threadedly movable on said driver member, and an output member secured to said hub shell means.

5. In a hub as set forth in claim 4, brake means responsive to threaded movement of said input member on said driver member for frictionally connecting said hub shell means with said shaft.

6. In a hub as set forth in claim 2, said coupling means including a sleeve member, first gear rim means on said sleeve member, and respective gear rim means on said planet wheel carrier and said ring gear means alternatively engageable with said first gear rim means.

7. In a hub as set forth in claim 6, second gear rim means on said sleeve member meshing with corresponding gear rim means on said driver member.

8. In a hub as set forth in claim 1, speed changing means for axially moving said coupling means.

9. In a hub as set forth in claim 8, said speed changing means including an actuator member secured on said shaft against rotation and axially slidable thereon, and motion transmitting means secured to said actuator member and extending outward of said hub for connecting said actuator member to an external control mechanism.

10. In a hub as set forth in claim 8, said sprocket means being rotatable relative to said shaft in two opposite directions, said hub shell means being drivingly engaged by said clutch means when said sprocket means rotates in one of said directions; said speed changing means including an actuator member engaging said coupling means and responsive to rotation of said sprocket means in the other one of said directions for axially moving said coupling means.

11. In a hub as set forth in claim 10, coaster brake means responsive to rotation of said sprocket means in said other direction through a predetermined angle for frictionally connecting said hub shell means with said shaft.

12. In a hub as set forth in claim 10, abutment means for limiting rotation of said sprocket in said opposite direction to a predetermined angle.

References Cited by the Examiner
UNITED STATES PATENTS

| | | |
|---|---|---|
| 863,424 | 8/07 | Newton et al. |
| 863,426 | 8/07 | Newton et al. |
| 2,687,050 | 8/54 | Brown. |

DON A. WAITE, *Primary Examiner.*